United States Patent
Dippon

(10) Patent No.: US 11,620,264 B2
(45) Date of Patent: Apr. 4, 2023

(54) LOG FILE PROCESSING APPARATUS AND METHOD FOR PROCESSING LOG FILE DATA

(71) Applicant: Rohde & Schwarz GmbH & Co. KG, Munich (DE)

(72) Inventor: Andreas Dippon, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 17/458,719

(22) Filed: Aug. 27, 2021

(65) Prior Publication Data
US 2023/0061305 A1    Mar. 2, 2023

(51) Int. Cl.
G06F 16/00 (2019.01)
G06F 16/18 (2019.01)
G06F 16/13 (2019.01)

(52) U.S. Cl.
CPC .......... *G06F 16/1805* (2019.01); *G06F 16/13* (2019.01)

(58) Field of Classification Search
CPC .............................. G06F 16/1805; G06F 16/13
See application file for complete search history.

(56) References Cited

U.S. PATENT DOCUMENTS

| | | | |
|---|---|---|---|
| 2005/0114505 A1* | 5/2005 | DeStefano .......... | H04L 63/1416 709/224 |
| 2005/0187855 A1* | 8/2005 | Brennan ................ | G06Q 40/06 705/37 |
| 2007/0233706 A1* | 10/2007 | Farber .................... | H04L 67/125 |
| 2007/0260931 A1* | 11/2007 | Aguilar-Macias .......................... | G06F 11/3476 714/39 |
| 2008/0010497 A1* | 1/2008 | Kronlund ............ | G06F 11/0769 714/6.11 |
| 2012/0297181 A1* | 11/2012 | Lee .......................... | G06F 8/658 713/2 |
| 2013/0110943 A1* | 5/2013 | Menon ................. | G06Q 10/107 709/206 |
| 2016/0098342 A1 | 4/2016 | Faizanullah et al. | |
| 2016/0188663 A1* | 6/2016 | Tsumura ............... | G06F 16/245 715/771 |
| 2016/0275101 A1* | 9/2016 | Hinterbichler ...... | G06F 16/1734 |

* cited by examiner

Primary Examiner — Syed H Hasan
(74) Attorney, Agent, or Firm — Westman, Champlin & Koehler, P.A.

(57) ABSTRACT

The present invention provides a processing of log file data from multiple log files. Log file data from multiple log files are combined together according to timestamp information. A column of the combined log file can refer to different characteristics, depending on which log file the respective line refers to.

19 Claims, 3 Drawing Sheets

LOG FILE PROCESSING APPARATUS AND METHOD FOR PROCESSING LOG FILE DATA

TECHNICAL FIELD

The present invention relates to a method for processing log file data. The present invention further relates to a log file processing apparatus. In particular, the present invention relates to processing of log data from multiple log files.

BACKGROUND

Even though applicable in general to the processing of any kind of log files, the present invention and its underlying problem will be hereinafter described in connection with log files from measurement devices, in particular measurement devices in the field of electric engineering.

During development and production as well as for maintenance purposes a variety of tests may be performed for assessing the quality of a product or identifying failures. Running a test may produce multiple log files from different entities of the test arrangement. In order to fully analyze a certain behavior during the test, a user has to consider these multiple log files individually.

The individual log files may comprise information related to different aspects of the test operation. Accordingly, the individual log files may comprise data fields (e.g., in form of individual columns) related to different pieces of information. Accordingly, a user may consider the content of multiple log files in parallel in order to identify relationships between the individual entries of the multiple log files. Such an individual analysis of multiple log files is a time-consuming and complex task. Furthermore, a user may easily overlook an important entry in one of the multiple log files when manually comparing log files.

SUMMARY

Against this background there is a need for an improved processing and analysis of log file data. In particular, there is a need for an improved analysis of log file data from multiple log files related to a same measurement procedure. Thus, the present invention provides a method and an apparatus for processing log file data from multiple log files. Especially, the present invention provides a processing of log file data in order to enable a user for an improved and simplified analysis of log file data from multiple log files in a combined representation of log file data.

This is achieved by the features of the independent claims. Further advantageous embodiments are subject matter of the dependent claims.

According to a first aspect, a method for processing log file data is provided. The method comprises a step of obtaining a number of at least two log files. The at least two log files comprise at least a first and a second log file. Each log file comprises multiple columns with data elements. The first log file comprises at least one column relating to a characteristic which does not exist in the second log file. Further, each log file comprises a column with data elements specifying timestamp information. The method further comprises combining the obtained number of at least two log files. In this way, a combined log file is generated. The combined log file comprises at least one column relating to a characteristic which is different depending on which log file a respective line of the combined log file refers to. Lines of the combined log file are sorted according to the timestamp information. The method further comprises generating a log file header for specifying characteristics in the columns of the combined log file depending on which log file a line of the combined log file refers to. Further, the method comprises outputting the combined log file and the generated log file header. The lines of the combined log file which is output are marked depending on which log file a line of the combined log file refers to.

According to a further aspect, a log file processing apparatus is provided. The log file processing apparatus performs a processing of log file data. The log file processing apparatus comprises an interface, a processor and an output device. The interface is configured to obtain a number of at least two log files. The number of at least two log files comprise at least a first log file and a second log file. Each log file comprises multiple columns with data elements. The first log file comprises at least one column relating to a characteristic which does not exist in the second log file. Further, each log file comprises a column with data elements specifying timestamp information. The processor is configured to combine the obtained number of at least two log files. In this way, the processor may generate a combined log file. The combined log file comprises at least one column relating to a characteristic which is different depending on which log file a respective line of the combined log file refers to. The processor is further configured to sort the lines of the combined log file according to the timestamp information. The processor is further configured to generate a log file header. The log file header for specifying characteristics in the columns of the combined log file depending on which log file a line of the combined log file refers to. The output device is configured to output the combined log file and the generated log file header. The lines of the combined log file are marked depending on which log file a line of the combined log file refers to.

The present invention is based on the finding that a test operation, in particular a test operation in an arrangement with multiple entities, many log files are produced. In order to fully analyze the test operation and the behavior of the related components during the test, the outcome of the multiple test logs have to be considered. However, individually analyzing the multiple test files is a time-consuming and complex task.

The present invention therefore takes into account this finding and aims to provide a processing of multiple log files, especially multiple log files obtained during a test or measurement operation. In particular, the present invention aims to process multiple separate log files obtained during a test or measurement procedure in order to produce clear and well-arranged representation of information provided by the multiple log files. In particular, the present invention aims to generate a clear and well-arranged summary of data from multiple log files in a single dataset.

Since the individual log files relate to log data of different entities, each log file may comprise log data relating to different properties. The present invention therefore aims to generate a combined representation of the log files which takes into account this fact. Especially, the individual lines of the combined log file may comprise different entries in form of currents relating to different properties, depending on which log file/entity the respective line relates to. Accordingly, the user is in the position to easily analyze the behavior of the measurement during a test procedure. Based on the outcome of the processing, the user can easily recognize relationships between different entries from the individual log files and recognize, for example, circumstances which may have led to a particular event. In this way, a test procedure can be analyzed easier and within a shorter period of time. Moreover, the risk that a user may overlook one or more particular entries in one of the multiple log files can be reduced. Consequently, the analysis of the test procedure and a subsequent service operation can be accelerated. Further to this, even complex relationships can be easily identified.

As already mentioned above, log data from two or more log files can be combined together and the combination of the multiple log files can be easily evaluated. Each log file may comprise log data related to a particular entity. For example, the test arrangement may comprise multiple entities, wherein each entity provides log data in a separate log file. For example, the test arrangement may comprise one or more measurement devices, wherein each measurement device provides log data in a separate log file. For example, the measurement devices may comprise measurement devices such as an oscilloscope, a network analyzer, a spectrum analyzer, a power detector, or any other kind of device for measuring signals such as radio frequency (RF) signals, voltages, currents or any other physical parameter. Furthermore, the test arrangement may also comprise one or more signal generators for generating test signals. For example, the test arrangement may comprise one or more signal generators for generating RF signals, in particular modulated RF signals, voltages, or any other kind of test signal. However, it is understood, that the test arrangement may also comprise any other kind of device for performing a desired test procedure.

The log data of the multiple log files may be obtained by a processing apparatus and processed in order to generate a combination of multiple log files. The combination of the multiple log files may be provided to a user or a further device for a subsequent analysis. For this purpose, an entity such as a measurement device, signal generator or any other component of a test arrangement may generate log data and provide the generated log data in form of a log file. For example, an entity may locally store log data in a memory of the entity during a test procedure. After completing the test procedure, the locally stored log data may be forwarded to the processing apparatus in form of a log file. Alternatively, it may be also possible that an entity of the arrangement may forward log data during the test procedure to the processing apparatus, and the forwarded log data are stored in a memory of the processing apparatus in form of a log file. However, any other way for forwarding log data from an entity of a test arrangement to the processing apparatus in order to obtain log files may be possible, too. In particular, the processing apparatus may comprise one or more interfaces which are communicatively coupled with the entities of the test arrangement in order to receive the log data. For example, the log data may be received by a wired or wireless communication network, a communication bus or the like.

When providing the log data of an entity of the test arrangement to the processing apparatus, the processing apparatus may be also informed about the individual data fields in the log data. For example, an entity of the test arrangement may provide an individual header specifying the data fields comprised in the log data. For instance, an entity of the test arrangement may provide log data comprising a dataset with multiple data fields, wherein each data field comprises data relating to a specific property. For example, such a dataset may comprise a data field with a serial number, a data field with a timestamp information and further data fields relating to specific information. Hence, the information about the content of each data field may be provided from the respective entity to the processing apparatus in an appropriate manner. For example, a log file may be provided, wherein the log file comprises a header specifying the individual data fields. However, any other manner for specifying or characterizing the individual data fields of the log data may be possible, too. For example, the specification of the individual data fields may be also provided to the processing apparatus in advance and/or may be already locally stored in a database of the processing apparatus.

After obtaining log data of multiple log files from the individual entities, a combination of the log data of the multiple log files is generated. The processing of the log data of the multiple log files may be performed, for example, by a processor of the processing apparatus. In order to obtain the log data from the multiple log files, the processor may be communicatively coupled with a local memory and/or entities of the test arrangement. For example, the processor may be communicatively coupled with a local memory via a memory bus in order to obtain the log data of one or more log files. The memory may be an internal memory such as a random-access memory, or a storage device such as a hard disc or a solid-state drive. Additionally, or alternatively, the processor may receive log data relating to one or more log files from an entity of the test arrangement. For this purpose, the processor may be communicatively coupled to the respective entities by a network connection or a communication bus.

The processor may comprise, for example, a general-purpose processor with corresponding instructions. The processor may be controlled by the instructions that cause the processor to perform the desired operations. For this purpose, the processor may comprise a processing unit that is coupled to a memory. The memory may store instructions that cause the processing unit to perform the desired operations.

As already mentioned above, each line of a log file may comprise at least one data field with timestamp information. Further to this, each line of a log file may comprise one or more further data fields with appropriate information. In the following, each data field of a line of a log file is denoted as a column of the log file. Accordingly, each log file comprises at least one column with timestamp information and one or more further columns with additional data.

In order to obtain a combination of multiple log files, the multiple log files may be merged together. For example, a further log file may be generated including the data of multiple log files of individual entities. For this purpose, the further log file may include a combination of all line of the individual log files. Since each log file comprises at least one column with timestamp information, the further log file with the log file data from the multiple log files may be sorted according to the timestamp information. In this way, the further log file may comprise log file data from multiple log files wherein the individual lines are arranged in a chronological order. If appropriate, an additional column may be added in order to indicate to which log file the respective line relates. However, as will be explained in more detail below, any further measure for indicating a relationship of a particular line to a related log file or entity may be possible, too.

The individual log files may comprise columns relating to different properties or characteristics of an entity. Thus, at least some of the individual log files may have one or more column relating to a characteristic which is not included in one or more other log file. When merging together the individual log files, the resulting combined log file therefore comprises one or more columns relating to different characteristics or properties depending on the origin of the respective line.

In order to clearly specify the relationships between the data in the individual columns of a line depending on the related log file from which the data are taken from, and to outline the characteristic or parameter to which the content of a particular column in the further log file with the merged log file data relates, an additional header is generated. This additional header may comprise a separate line for each log file which has been merged into the further log file with the combined log file data. Accordingly, each line of the header may comprise multiple columns, wherein each column includes a specification of the respective parameter or characteristic in a related column of the respective log file. In this way, a relationship between the characteristic parameter or property specified in the header and the related value in the respective column of a line in the further log file with the merged log file data can be specified.

In this way, a single file or representation is generated comprising log file data from multiple log files. Based on the generated header, a relationship between the content in the individual columns of a log file and the related characteristics or parameters can be easily specified and recognized by a user. In particular, if such a log file is provided to a user on a display or any other appropriate manner, the generated header may be provided on a fixed position, even if the further lines of the generated log file date are scrolled up and down. As will be further explained in more detail below, the individual lines of the further log file with the merged log file data will be modified by any appropriate manner, for example by different colors, depending on the respective log file from which such a line has been taken. By adapting the individual lines of the header accordingly, a user can easily recognize to which entity a respective line of the further log file with the merged log file data relates to.

In this way, a single dataset or representation with log file data from multiple log files is generated in a manner which can be easily analyzed and evaluated by a user without any further measures.

Further embodiments of the present invention are subject of the further subclaims and of the following description, referring to the drawings.

In a possible embodiment, the combined log file is displayed together with the generated log file header. In particular, the file later and the header may be displayed on a display device. The display may be, for example, a display of a measurement device, or any other appropriate device for receiving and processing the log file data.

In a possible embodiment, a user input may be received for specifying a width of each column in the log file. For this purpose, any appropriate user input device may be used. For example, user input may be received by a keyboard, a knob, a touch screen or the like. The user may specify a common width for multiple lines in the log file relating to different log files. Alternatively, it may be also possible that the user may specify the width of each column individually for different lines of the log file. Accordingly, the log file header and the combined log file may be output, in particular displayed, in a representation according to the width of the columns specified based on the user input. For example, a representation of the log file header and the log file data of the combined log file may be displayed on a display according to the user-defined specifications.

In a possible embodiment, a user may specify an order of the individual columns of the combined log file. For this purpose, a user input may be received, for example by a user input device. The user input device may be the same user input device as used for receiving user specifications related to a width of the individual columns. Accordingly, the log file and the header may be generated according to the specified order for the individual columns. Further, the individual lines of the combined log file may be also arranged according to the user-defined specification. In this way, a user can individually arrange the columns in the combined log file according to his needs.

In a possible embodiment, a width relating to one column in one line of the log file may extend over two or more columns of another line in the log file. A column in one line of the log file and the respective column in the header may extend over a wider range compared to columns from other log files. In this way, the width of a column may be extended if, for example, the description of the content or property in the log file header or the value in the respective line of the log file is longer than content in related columns of other log files In a possible embodiment, each line of the combined log file is displayed with different properties depending on the log file from which data of a respective line originate. In particular, a line of a combined fifth log file may be displayed by different colors depending on the log file from which the respective data originate. For example, the text color and/or the background color of a line may be changed depending on the source of the respective data. However, any further property may be adapted depending on the log file from which the respective data have been taken from.

In a possible embodiment, the generated header comprises a separate line for each obtained log file which is included in the combined file. C In case that multiple log files comprise one or more column relating to a same characteristic, for example timestamp information, the respective column may extend over all lines of the header.

In a possible embodiment, multiple log files of the number of at least two log files may contain columns relating to a same characteristic. In this case, columns relating to the same characteristic may be arranged in a same column. Thus, a user can easily associate the respective information in the related column.

In a possible embodiment, related columns, in particular columns which relate to same characteristics or properties may be identified in the at least two of the log files. Accordingly, the identified related columns may be arranged in a same column in the log file and the respective lines of the log file header. Accordingly, related information can be easily recognized by a user in the representation of the combined and sorted log file.

In a possible embodiment, a filter operation may be applied to the generated and sorted log file. For example, a user may specify one or more filter criteria for filtering the log file data. Accordingly, unwanted data, for example unwanted columns and/or time intervals may be filtered out according to the specification of the filter criteria. However, it is understood, that any other filter criteria may be also applied, for example for selecting only a subgroup of content or removing a particular portion of log file data.

BRIEF DESCRIPTION OF THE DRAWINGS

For a more complete understanding of the present invention and advantages thereof, reference is now made to the following description taking in conjunction with the accompanying drawings. The invention is explained in more detail below using exemplary embodiments, which are specified in the schematic figures and the drawings, in which:

FIG. 3: shows a representation of a log file header generated according to an embodiment;

FIG. 4: shows an alternative header generated according to an embodiment; and

Figures 1, 2:
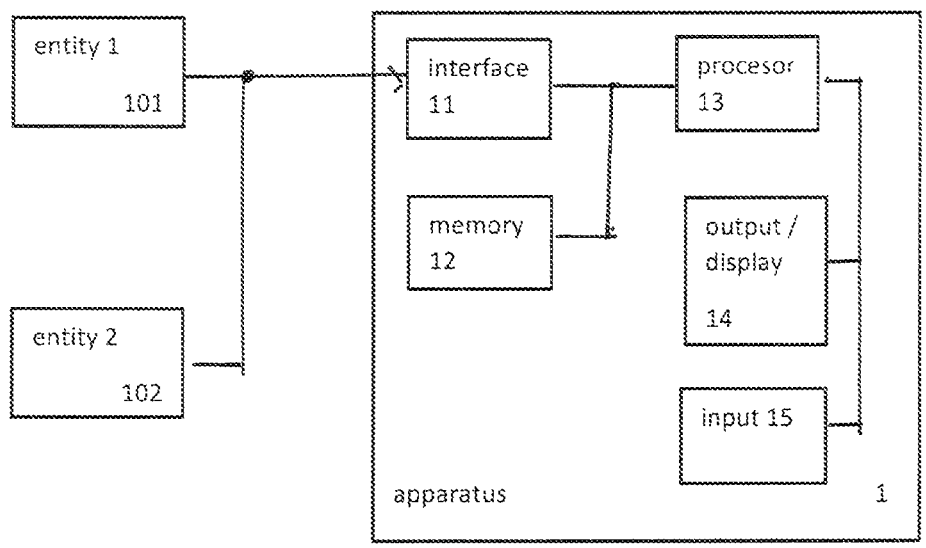
FIG. 1: shows a schematic block diagram of a log file processing apparatus according to an embodiment.
FIG. 2: shows a schematic illustration of a log file as generated according to an embodiment.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DESCRIPTION OF EMBODIMENTS

FIG. 1 shows a schematic illustration of a test arrangement with a log file processing apparatus 1 according to an embodiment. As can be seen in this FIG. 1, log file processing apparatus 1 may be communicatively coupled with one or more entities 101, 102 providing log file data. The entities 101, 102 may be any kind of device providing log file data. For example, entities 101, 102 may be devices of a test arrangement such as a signal generator, a voltage source, an RF emitter or the like. Furthermore, entities 101, 102 may also be a measurement device such as an oscilloscope, a spectrum analyzer, a network analyzer or any other appropriate measurement device, for example, for measuring a voltage, a current or any other physical property. However, it is understood, that entities 101, 102 may also relate to any other appropriate entity providing log file data.

Entities 101, 102 may perform desired operations, for example generate test signals or perform measurement operation. During these operations, each entity 101, 102 may generate log data. The log data may be stored in a local memory of the respective entity 101, 102. In this way, a log file may be generated comprising the respective log file data. After completing a test or measurement procedure or another desired task, the respective log file may be transferred from the memory of the entity 101, 102 to log file processing apparatus 1.

Alternatively, it is also possible that the entities 101, 102 may continuously provide log file data to the log file processing apparatus 1. In this case, log file processing apparatus 1 may receive the continuously provided log file data and store the received log file data in respective log file for each entity 101, 102 individually.

In order to obtain the log file data from the entities 101, 102, log file processing apparatus 1 may be communicatively coupled with the entities 101, 102. For example, a wired or wireless communication link may be established between the log file processing apparatus 1 and the entities 101, 102. For example, log file processing apparatus 1 may comprise an interface 11 for communicatively coupling the log file processing apparatus 1 with the entities 101, 102. For example, the log file processing apparatus 1 may be connected with the entities 101, 102 by a network connection or a communication bus. Furthermore, it may be also possible that the entities 101, 102 store the log files with the log file data on a removable storage medium. After completing the test or measurement task, the removable storage medium may be removed from the respective entity 101, 102 and inserted into an interface 11 for reading the removable storage medium. It is understood, that any further method for transferring the log files with the log file data from the entities 101, 102 to the log file processing apparatus 1 may be possible, too.

Accordingly, log file processing apparatus 1 obtains the log files with the log file data from the multiple entities 101, 102. Even though only two entities 101, 102 are illustrated in FIG. 1, it is understood, that any number of two or more entities 101, 102 may be possible. Accordingly, log file processing apparatus 1 may obtain two or more log files with log file data. The individual log files with the log file data may be stored, for example, in a memory or storage device 12 of log file processing apparatus 1. Based on the multiple log files, log file processing apparatus 1 generates a combination with log file data from the multiple individual log files.

The individual log files from the different entities 101, 102 may comprise different data fields. In the following, it is assumed that each log file comprises multiple lines with multiple data fields. Each data field in a log file is considered as a column. In order to evaluate the temporal correlation of the individual lines, each log file comprises at least one column with timestamp information. Accordingly, each line of a log file can be associated to a particular point in time. A timestamp information may relate to an absolute time, for example GMT. However, it may be also possible to use a relative timing. For example, the individual entities 101, 102 may be synchronized with each other in order to have a common time basis.

Further to the timestamp information, each log file may comprise one or more further columns, each: comprising data elements relating to a specific characteristic. As the log files are generated by different entities 101, 102, the individual currents of the respective log files may relate to different characteristics. In other words, a log file from first entity 101, 102 may comprise one or more columns with data elements relating to characteristics which are different from data elements in columns of a second entity 101, 102. Further to this, even if two obtained log files may comprise columns with data elements relating to the same or similar characteristics, the respective columns may be arranged at different positions in the respective log files.

Log file processing apparatus 1 may further comprise a processor 13 for processing the log file data of the individual log files in order to generate a combination of the individual log files. For this purpose, processor 13 merges together the log data of the multiple log files. In particular, processor 13 generates a combined log file comprising all lines with log data of the multiple log files. If applicable, processor 13 may add a further column indicating the origin of the respective log file for the individual lines in the combined log file.

As already mentioned above, a log file of the multiple log files may comprise one or more columns relating to characteristics which are not included in another log file. Accordingly, when combining the multiple log files to a combined log file, a data element in one of the columns of the combined log file may relate to different characteristic depending on the log file from which the respective line has been taken.

The individual lines of the combined log file may be sorted, for example, by processor 13, in a temporal order according to the timestamp information. In this way, a combined log file which is sorted according to the timestamp information is obtained. Since the individual columns of such a combined log file may relate to different content depending on the origin of the respective line in the combined log file, processor 13 further generates a header for specifying a description of the content of the respective columns. For this purpose, processor 13 generates a log file header comprising a separate line for each log file which has been included in the combined log file. For example, a first line of the log file header may specify the content of the individual columns in a line relating to log file data from first entity 101, 102, a second line of the log file header may specify the content of the individual columns in a line of the log file from a second entity 101, 102, etc. In this way, the generated header clearly specifies the content of the individual columns depending on the log file for which the respective line has been taken from.

The generated header and the log file with the combined and sorted log file data may be stored in a memory of log file processing apparatus 1 and/or may be output on an internal device and/or to an external apparatus.

For example, the generated header and the combined log file may be output on a display 14 of log file processing apparatus 1. For example, the log file header may be displayed on a fixed position within display 14. Further, the individual line of the combined log file may be also displayed on the display 14, for example below the displayed log file header. Depending on the length of the combined and filtered log file, the individual lines may be scrolled up and down. For example, each line of the combined log file may comprise a column indicating the log file from which the respective line has been taken. Based on this indication, a user can easily compare this information with the respective line of the log file header in order to match the content in a column of the respective line with the information regarding the respective property in the displayed log file header.

Furthermore, any other measure for indicating the allocation of a respective line in the combined and filtered log file to a particular log file and the related line in the log file header may be possible, too. For example, each line in the log file header may be displayed with an individual color or color scheme. In this case, each line of the log file may be also displayed with the same color or color scheme depending on the log file from which the respective data has been taken. For example, the text and/or background of the respective line may be adapted accordingly. However, it is understood, that any other measure for indicating the relationship of the individual lines in the combined and filtered log file to a specific log file and the related line in the log file header may be possible, too.

FIG. 2 shows an exemplary illustration of a representation of log file header and some lines of the combined log file data. Even though the examples in FIG. 2 and the following figures only relate to a combination of two log files, it is understood, that any number of two or more log files may be combined together.

As can be seen in FIG. 2, log file header 300 may comprise two lines 301, 302. The first line 301 may specify the content of the individual columns in case that a line of the combined log file has been taken from a first log first. Accordingly, lines 302-307 specifies the content of the individual columns in case that a line of the log file has been taken from a second log file.

Since the first columns 201 relates to a serial number, and the second column 202 relates to a timestamp information, and these columns are the same independent whether the log file data has been taken from the first log file or the second log file, these columns extend over all lines of the log file header 300.

The remaining columns 203, 204, 205 specify the content for each column, wherein different descriptions are provided depending on whether the respective line relates to a line of a first log file or a second log file.

Below log file header 300, multiple log file lines 303-307 are shown. As can be seen in this example, the first line 303 and the second line 304 represent log file data from a first log file. Further, line 305 illustrates a line of a log file from a second log file. This can be easily recognized, for example, by a different color or the like. In the example of FIG. 2, log file data from the second log file are illustrated by shaded lines. It can be further recognized that the log file data in line 304 from the first log file and the log file data in the third line 305 from the second log file relate to a same point in time 00:02. Accordingly, a user can easily recognize all relevant information of this point in time based in the information illustrated in the second line 304 and the third line 305. Further, the user can easily recognize to which information in the individual columns relate by considering the displayed header 300.

In the following, line 306 relates to log file data from the first log file. Further, line 307 relates to log file data from the second log file at a point in time different to the log file data in the line above from the first log file.

In the example shown in FIG. 2, the first log file and the second log file have a same number of columns. Further, a width of each column 203, 204, 205 is the same.

Figures 3, 4:
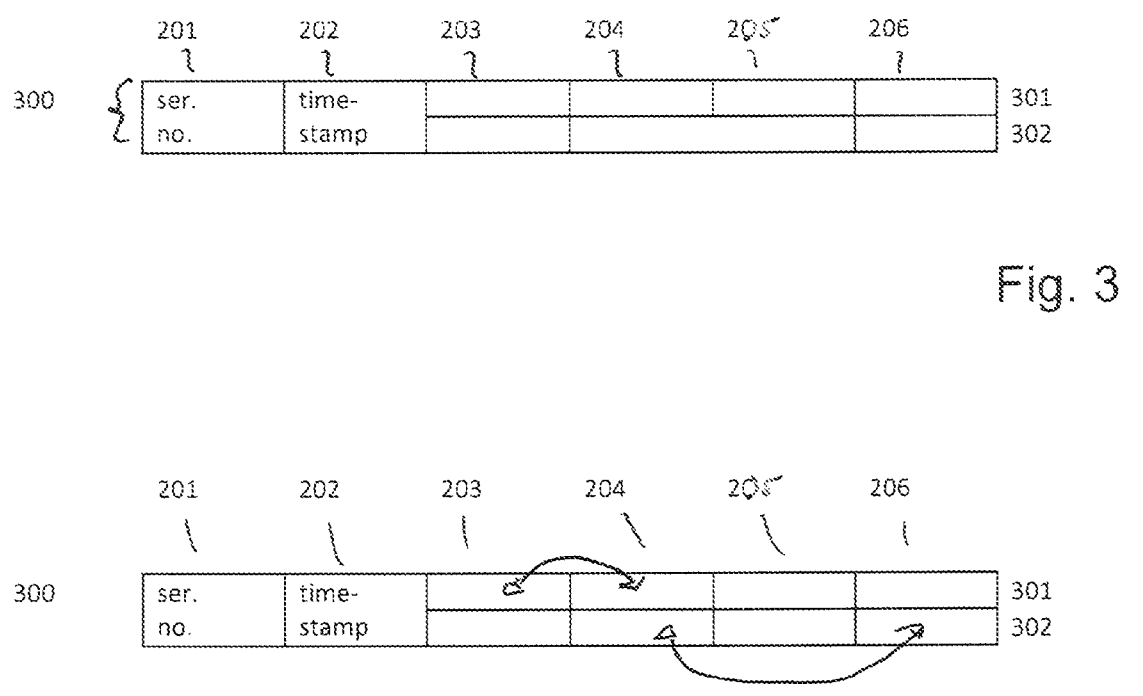

FIG. 3 shows a representation of an alternative header 300, which relates to a combined log file with a corresponding configuration. In this alternative representation, a width of the individual columns in the log file header and accordingly in the related log file lines may be different depending on whether the respective line relates to log file data from a first or a second log file (or a further log file). In particular, a line of a log file relating to log file data from a first log file may comprise, further to the serial number and a timestamp information, four further columns 203-206. In contrast to this, a line from a second log file comprises, further to the serial number and the timestamp information, only three further columns. Accordingly, at least one column may have a width which is larger than the width of the columns relating to the first log file. For example, one column in the header relating to the second log file may extend over two columns 204, 205 relating to the first log file.

For example, the width of the individual columns may be set automatically depending on the number of columns of the respective log file. Furthermore, the width may be also set automatically depending on the length of the description or content in the individual fields.

Alternatively, it may be also possible that a user may manually adjust the width of the columns individually. For example, log file processing apparatus 1 may comprise an input device 15 for receiving a user input in order to adjust the width depending on the user requirements. For example, the input device may comprise a touch screen, a keyboard or knob or any other appropriate input device.

Furthermore, it may be also possible that a user may select a subgroup of columns from one or more of the multiple log files which have to be included in the combined log file representation.

Further, a user may also enter further filter criteria. For example, a user may enter filter criteria in order to limit a time range of the log file data which are used for generating the combined log file representation. However, any other appropriate specification for filter criteria in order to select only a subgroup or filter out some data may be possible, too.

Further, a user may also manually adjust an order of the individual columns in the generated representation of the combined log file.

As illustrated, for example, in FIG. 4, a user may change the order of the third and fourth column for log file data from a first log file and modify the order of the fourth and sixth column for log file data from a second log file. However, it is understood, that this example for changing an order of the individual columns does not limit the present invention. Moreover, any other specification for adapting the order of the individual columns may be possible, too.

Furthermore, it may be also possible that log file processing apparatus 1 may automatically identify related columns in the individual log files and arrange related columns one above the other automatically. For example, if multiple log files comprise columns relating to a specific property, e.g., a voltage, frequency or another physical property, the respective columns may be arranged one above another such that the respective property is represented in a same column for all log files.

Figure 5:
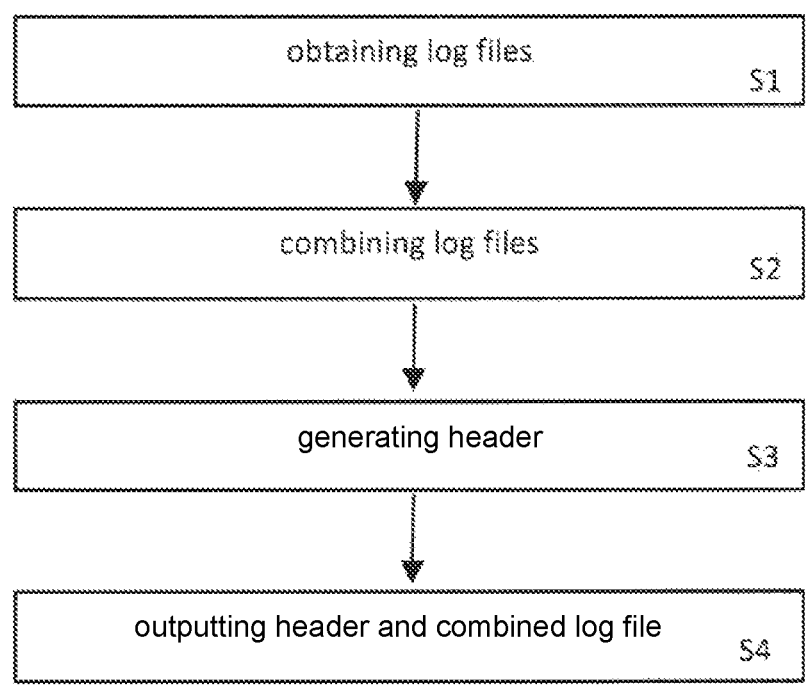
FIG. 5: shows a flow diagram illustrating a method for processing log file data according to an embodiment.

FIG. 5 shows a flow diagram illustrating the method for processing log file data according to an embodiment. It is understood, that the method for processing log file data may comprise any appropriate method step for performing an operation as already described above in connection with the log file processing apparatus 1. Accordingly, log file processing apparatus 1 may comprise any appropriate component in order to perform an operation as described below in connection with the method for processing log file data.

In step S1, a number of at least two log files is obtained. Each log file may comprise multiple columns with data elements. The obtained log files may comprise at least a first log file and a second log file. The first log file comprises at least one column relating to a characteristic which does not exist in the second log file. Each log file comprises at least one column with data elements specifying timestamp information.

In step S2, the obtained number of at least two log files are combined to a combined log file. The combined log file comprises at least one column relating to a characteristic which is different depending on which log file a respective line of the combined log file refers to. The lines of the combined log file are sorted according to the timestamp information.

In step S3, a log file header is generated. The log file header specifies characteristics in the columns of the combined log file depending on which log file a line of the combined log file refers to.

In step S4, the generated log file header and the combined log file are output. The lines of the combined log file are marked depending on which log file a line of the combined log file refers to. In particular, the log file header and the combined and sorted log file may be displayed on a display.

Especially, each line of the combined and sorted log file may be displayed with different properties depending on the log file from which the data of the respective line originates. For example, different colors may be used for the individual lines depending on the log file from which the respective line has been taken.

Summarizing, the present invention relates to a processing of log file data from multiple log files. Log file data from multiple log files are combined together such that the individual lines of all log files are merged and sorted according to timestamp information. A column of the combined log file can refer to different characteristics, depending on which log file the respective line refers to.

In the foregoing detailed description, various features are grouped together in one or more examples or examples for the purpose of streamlining the disclosure. It is understood that the above description is intended to be illustrative, and not restrictive. It is intended to cover all alternatives, modifications and equivalents as may be included within the scope of the invention. Many other examples will be apparent to one skilled in the art upon reviewing the above specification.

Specific nomenclature used in the foregoing specification is used to provide a thorough understanding of the invention. However, it will be apparent to one skilled in the art in light of the specification provided herein that the specific details are not required in order to practice the invention. Thus, the foregoing descriptions of specific embodiments of the present invention are presented for purposes of illustration and description. They are not intended to be exhaustive or to limit the invention to the precise forms disclosed; obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Throughout the specification, the terms "including" and "in which" are used as the plain-English equivalents of the respective terms "comprising" and "wherein," respectively. Moreover, the terms "first," "second," and "third," etc., are used merely as labels, and are not intended to impose numerical requirements on or to establish a certain ranking of importance of their objects.

LIST OF REFERENCE SIGNS

1 log file processing apparatus
11 interface
12 memory
13 processor
14 display/output device
15 input device
101, 102 entities
201 . . . 206 columns
300 header
301 . . . 307 lines
S1 . . . S4 method steps

The invention claimed is:

1. A method for processing log file data by a log file processing apparatus, the method comprising:
Obtaining, by a processor of the log file processing apparatus, a number of at least two log files comprising at least a first log file and a second log file, each log file comprising multiple columns with data elements, the first log file comprises at least one column relating to a characteristic which does not exist in the second log file, and each log file comprises at least one column with data elements specifying time stamp information;
Combining, by the processor, the obtained number of at least two log files to obtain a combined log file, wherein the combined log file comprises at least one column relating to a characteristic which is different depending on which log file a respective line of the combined log file refers to, and wherein lines of the combined log file are sorted according to the timestamp information, wherein a width relating to one column in a line of the log file relating to one of the at least two log files extends over two or more columns of a line relating to another one of the at least two log files based on the number of columns of the respective log file;

Generating, by the processor, a log file header for specifying characteristics in the columns of the combined log file depending on which log file a line of the combined log file refers to; and Outputting, on a display of the log file processing apparatus, the combined log file and the generated log file header, wherein the lines of the combined log file are marked depending on which log file a line of the combined log file refers to.

2. The method of claim 1, wherein outputting the combined log file and the generated log file header comprises displaying the combined file together with the generated log file header on a display.

3. The method of claim 2, comprising receiving a user input for specifying a width of each column in the combined log file;
wherein the combined log file is displayed together with the generated log file header according to the received user input for specifying the width of each column.

4. The method of claim 2, comprising receiving a user input for specifying an order of the columns of combined log file;
wherein combining the log file according to the specified order comprises arranging the order of the columns in the combined log file according to the specified order.

5. The method of claim 2, wherein a width relating to one column in a line of the log file relating to one of the at least two log files extends over two or more columns of a line relating to another one of the at least two log files.

6. The method of claim 2, wherein each line of the combined file is displayed with different properties depending on which log file a line of the combined log file refers to.

7. The method of claim 6, wherein the different properties comprise individual colors for each of the number of at least two log files.

8. The method of claim 1, wherein the generated log file header comprises a separate line for each of the obtained at least two log files.

9. The method of claim 1, wherein multiple log files of the number of at least two log files contain columns relating to a same characteristic and the columns relating to the same characteristic are arranged in the combined log file in a same column.

10. The method of claim 1, comprising identifying related columns in the number of at least two log files;
wherein the identified related columns in the number of at least two log files are arranged in a same column in the combined log file.

11. A log file processing apparatus for processing log file data, the log file processing apparatus comprising:
an interface for obtaining a number of at least two log files comprising at least a first log file and a second log file, each log file comprises multiple columns with data elements, the first log file comprises at least one column relating to a characteristic which does not exist in the second log file, and each log file comprises at least one column with data element specifying time stamp information;

a processor for combining the obtained number of at least two log files to obtain a combined log file, wherein the combined log file comprises at least one column relating to a characteristic which is different depending on which log file a respective line of the combined log file refers to, and wherein the processor is configured to sort the combined log file according to the timestamp information, wherein a width relating to one column in a line of the log file relating to one of the at least two log files extends over two or more columns of a line relating to another one of the at least two log files based on the number of columns of the respective log file, and to generate a log file header for specifying characteristics in the columns of the combined log file depending on which log file a line of the combined log file refers to; and a display for displaying the combined log file and the generated log file header, wherein the lines of the combined log file are marked depending on which log file a line of the combined log file refers to.

12. The apparatus of claim 11, wherein the output device comprises a display for displaying the combined log file together with the generated log file header.

13. The apparatus of claim 12, comprising an input device for receiving a user input for specifying a width of each column in the log file;
wherein the display is configured to display the combined log file together with the generated log file header according to the received user input for specifying the width of each column.

14. The apparatus of claim 13, wherein the input device is configured to receive a user input for specifying an order of the columns of combined log file; and
wherein the processor is configured to arrange the order of the columns in the combined log file and the generated log file header according to the specified order.

15. The apparatus of claim 12, wherein the display device is configured to display each line of the combined log file with different properties depending on which log file a line of the combined log file refers to.

16. The apparatus of claim 15, wherein the different properties comprise individual colors for each of the number of at least two log files.

17. The apparatus of claim 11, wherein the processor is configured to generate the log file header comprising a separate line for each of the obtained at least two log files.

18. The apparatus of claim 11, wherein multiple log files of the number of at least two log files contain columns relating to a same characteristic and the columns with the same characteristic are arranged in the combined log file in a same column.

19. The apparatus of claim 11, wherein the processor is configured to identify related columns in the number of at least two log files;
wherein the identified related columns in the number of at least two log files are arranged in a same column in the combined log file.

* * * * *